US007105609B2

(12) United States Patent
Datta et al.

(10) Patent No.: US 7,105,609 B2
(45) Date of Patent: *Sep. 12, 2006

(54) ALPHA-OLEFIN/PROPYLENE COPOLYMERS AND THEIR USE

(75) Inventors: Sudhin Datta, Houston, TX (US); Avinash Chandrakant Gadkari, Houston, TX (US); Charles Cozewith, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/351,187

(22) Filed: Feb. 9, 2006

(65) Prior Publication Data

US 2006/0128898 A1 Jun. 15, 2006

Related U.S. Application Data

(62) Division of application No. 10/613,373, filed on Jul. 3, 2003, now Pat. No. 7,019,081, which is a division of application No. 08/910,001, filed on Aug. 12, 1997, now Pat. No. 6,635,715.

(51) Int. Cl.
*C08F 4/06* (2006.01)

(52) U.S. Cl. .................. 525/240; 526/126; 526/127; 526/128; 526/348; 526/348.6

(58) Field of Classification Search ............ 526/126, 526/127, 128, 348; 525/240
See application file for complete search history.

(56) References Cited

U.S. PATENT DOCUMENTS

| | | | |
|---|---|---|---|
| 2,957,512 A | 10/1960 | Wade et al. |
| 3,156,242 A | 11/1964 | Crowe, Jr. |
| 3,262,992 A | 7/1966 | Holzer et al. |
| 3,378,606 A | 4/1968 | Kontos |
| 3,485,706 A | 12/1969 | Evans |
| 3,520,861 A | 7/1970 | Thomson et al. |
| 3,758,656 A | 9/1973 | Shih |
| 3,812,077 A | 5/1974 | Hobbs |
| 3,853,969 A | 12/1974 | Kontos |
| 3,881,489 A | 5/1975 | Hartwell |
| 3,882,197 A | 5/1975 | Fritz et al. |
| 3,888,949 A | 6/1975 | Shih |
| 3,989,867 A | 11/1976 | Sisson |
| 3,998,911 A | 12/1976 | Strametz et al. |
| 4,076,698 A | 2/1978 | Anderson et al. |
| 4,211,852 A | 7/1980 | Matsuda et al. |
| 4,322,027 A | 3/1982 | Reba |
| 4,330,646 A | 5/1982 | Sakurai et al. |
| 4,381,781 A | 5/1983 | Sciaraffa et al. |
| 4,411,821 A | 10/1983 | Howard, Jr. |
| 4,413,110 A | 11/1983 | Kavesh et al. |
| 4,425,393 A | 1/1984 | Benedyk et al. |
| 4,430,563 A | 2/1984 | Harrington |
| 4,461,872 A | 7/1984 | Su |
| 4,491,652 A | 1/1985 | Matthews et al. |
| 4,540,753 A | 9/1985 | Cozewith et al. |
| 4,542,199 A | 9/1985 | Kaminsky et al. |
| 4,543,399 A | 9/1985 | Jenkins, III et al. |
| 4,544,762 A | 10/1985 | Kaminsky et al. |
| 4,578,414 A | 3/1986 | Sawyer et al. |
| 4,588,790 A | 5/1986 | Jenkins, III et al. |
| 4,599,392 A | 7/1986 | McKinney et al. |
| 4,612,300 A | 9/1986 | Coleman, III |
| 4,644,045 A | 2/1987 | Fowells |
| 4,663,220 A | 5/1987 | Wisneski et al. |
| 4,668,566 A | 5/1987 | Braun |
| 4,668,753 A | 5/1987 | Kashiwa et al. |
| 4,752,597 A | 6/1988 | Turner |
| 4,758,656 A | 7/1988 | Itoh et al. |
| 4,808,561 A | 2/1989 | Welborn, Jr. |
| 4,830,907 A | 5/1989 | Sawyer et al. |
| 4,842,922 A | 6/1989 | Krupp et al. |
| 4,859,757 A | 8/1989 | Pellon et al. |
| 4,871,705 A | 10/1989 | Hoel |
| 4,874,880 A | 10/1989 | Miya et al. |
| 4,879,170 A | 11/1989 | Radwanski et al. |
| 4,897,455 A | 1/1990 | Welborn, Jr. |
| 4,909,975 A | 3/1990 | Sawyer et al. |
| 4,912,075 A | 3/1990 | Chang |
| 4,937,217 A | 6/1990 | Chang |
| 4,937,301 A | 6/1990 | Chang |
| 4,939,016 A | 7/1990 | Radwanski et al. |
| 4,940,464 A | 7/1990 | Van Gompel et al. |
| 4,960,878 A | 10/1990 | Crapo et al. |
| 4,988,781 A | 1/1991 | McKinney et al. |

(Continued)

FOREIGN PATENT DOCUMENTS

EP     0 037 659     10/1981

(Continued)

OTHER PUBLICATIONS

Carlson et al., "Component Relaxation Processes within Elastomeric Polypropylene, Macromolecules," vol. 32, pp. 8100-8106 (1999).

(Continued)

*Primary Examiner*—Bernard Lipman

(57) ABSTRACT

Improved thermoplastic polymer blend compositions comprising an isotactic polypropylene component and an alpha-olefin and propylene copolymer component, said copolymer comprising crystallizable alpha-olefin sequences. In a preferred embodiment, improved thermoplastic polymer blends are provided comprising from about 35% to about 85% isotactic polypropylene and from about 30% to about 70% of an ethylene and propylene copolymer, wherein said copolymer comprises isotactically crystallizable propylene sequences and is predominately propylene. The resultant blends manifest unexpected compatibility characteristics, increased tensile strength, and improved process characteristics, e.g., a single melting point.

64 Claims, No Drawings

U.S. PATENT DOCUMENTS

| | | |
|---|---|---|
| 5,008,228 A | 4/1991 | Chang |
| 5,015,749 A | 5/1991 | Schmidt et al. |
| 5,017,714 A | 5/1991 | Welborn, Jr. |
| 5,028,670 A | 7/1991 | Chinh et al. |
| 5,032,562 A | 7/1991 | Lo et al. |
| 5,037,416 A | 8/1991 | Allen et al. |
| 5,041,583 A | 8/1991 | Sangokoya |
| 5,041,584 A | 8/1991 | Crapo et al. |
| 5,041,585 A | 8/1991 | Deavenport et al. |
| 5,044,438 A | 9/1991 | Young |
| 5,057,475 A | 10/1991 | Canich et al. |
| 5,064,802 A | 11/1991 | Stevens et al. |
| 5,068,141 A | 11/1991 | Kubo et al. |
| 5,085,654 A | 2/1992 | Buell |
| 5,086,025 A | 2/1992 | Chang |
| 5,093,415 A | 3/1992 | Brady, III et al. |
| 5,096,867 A | 3/1992 | Canich |
| 5,106,804 A | 4/1992 | Bailly et al. |
| 5,108,820 A | 4/1992 | Kaneko et al. |
| 5,112,686 A | 5/1992 | Krupp et al. |
| 5,115,027 A | 5/1992 | Ogawa et al. |
| 5,120,867 A | 6/1992 | Welborn, Jr. |
| 5,132,262 A | 7/1992 | Rieger et al. |
| 5,132,380 A | 7/1992 | Stevens et al. |
| 5,134,209 A | 7/1992 | Job et al. |
| 5,147,949 A | 9/1992 | Chang |
| 5,153,157 A | 10/1992 | Hlatky et al. |
| 5,198,401 A | 3/1993 | Turner et al. |
| 5,218,071 A | 6/1993 | Tsutsui et al. |
| 5,229,478 A | 7/1993 | Floyd et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,280,074 A | 1/1994 | Schreck et al. |
| 5,296,433 A | 3/1994 | Siedle et al. |
| 5,296,434 A | 3/1994 | Karl et al. |
| 5,304,614 A | 4/1994 | Winter et al. |
| 5,321,106 A | 6/1994 | LaPointe |
| 5,322,728 A | 6/1994 | Davey et al. |
| 5,322,902 A | 6/1994 | Schreck et al. |
| 5,324,800 A | 6/1994 | Welborn, Jr. et al. |
| 5,331,054 A | 7/1994 | Fujita et al. |
| 5,336,552 A | 8/1994 | Strack et al. |
| 5,350,723 A | 9/1994 | Neithamer et al. |
| 5,352,749 A | 10/1994 | DeChellis et al. |
| 5,358,792 A | 10/1994 | Mehta et al. |
| 5,380,810 A | 1/1995 | Lai et al. |
| 5,382,400 A | 1/1995 | Pike et al. |
| 5,384,373 A | 1/1995 | McKinney et al. |
| 5,387,568 A | 2/1995 | Ewen et al. |
| 5,391,629 A | 2/1995 | Turner et al. |
| 5,405,922 A | 4/1995 | DeChellis et al. |
| 5,408,017 A | 4/1995 | Turner et al. |
| 5,412,020 A | 5/1995 | Yamamoto et al. |
| 5,416,178 A | 5/1995 | Winter et al. |
| 5,427,991 A | 6/1995 | Turner |
| 5,436,304 A | 7/1995 | Griffin et al. |
| 5,451,639 A | 9/1995 | Marczinke et al. |
| 5,453,471 A | 9/1995 | Bernier et al. |
| 5,455,305 A | 10/1995 | Galambos et al. |
| 5,461,113 A | 10/1995 | Marczinke et al. |
| 5,461,123 A | 10/1995 | Song et al. |
| 5,462,999 A | 10/1995 | Griffin et al. |
| 5,472,775 A | 12/1995 | Obijeski et al. |
| 5,473,028 A | 12/1995 | Nowlin et al. |
| 5,504,049 A | 4/1996 | Crowther et al. |
| 5,504,172 A | 4/1996 | Imuta et al. |
| 5,516,848 A | 5/1996 | Canich et al. |
| 5,516,866 A | 5/1996 | Resconi et al. |
| 5,539,056 A | 7/1996 | Yang et al. |
| 5,541,270 A | 7/1996 | Chinh et al. |
| 5,556,238 A | 9/1996 | Chinh |
| 5,556,928 A | 9/1996 | Devore et al. |
| 5,576,259 A | 11/1996 | Hasegawa et al. |
| 5,585,448 A | 12/1996 | Resconi et al. |
| 5,594,080 A | 1/1997 | Waymouth et al. |
| 5,599,761 A | 2/1997 | Turner |
| 5,608,019 A | 3/1997 | Cheruvu et al. |
| 5,616,661 A | 4/1997 | Eisinger et al. |
| 5,616,664 A | 4/1997 | Timmers et al. |
| 5,618,895 A | 4/1997 | Kerth et al. |
| 5,621,046 A | 4/1997 | Iwanami et al. |
| 5,621,127 A | 4/1997 | Langhauser et al. |
| 5,625,087 A | 4/1997 | Devore et al. |
| 5,637,660 A | 6/1997 | Nagy et al. |
| 5,641,828 A | 6/1997 | Sadatoshi et al. |
| 5,645,542 A | 7/1997 | Anjur et al. |
| 5,656,374 A | 8/1997 | Marzola et al. |
| 5,685,128 A | 11/1997 | Chum et al. |
| 5,686,533 A | 11/1997 | Gahleitner et al. |
| 5,700,896 A | 12/1997 | Dolle et al. |
| 5,703,187 A | 12/1997 | Timmers |
| 5,703,197 A | 12/1997 | Gordon et al. |
| 5,703,257 A | 12/1997 | Rosen et al. |
| 5,710,224 A | 1/1998 | Alt et al. |
| 5,721,185 A | 2/1998 | LaPointe et al. |
| 5,728,855 A | 3/1998 | Smith et al. |
| 5,731,253 A | 3/1998 | Sangokoya |
| 5,747,621 A | 5/1998 | Resconi et al. |
| 5,753,773 A | 5/1998 | Langhauser et al. |
| 5,760,141 A | 6/1998 | Watanabe et al. |
| 5,763,534 A | 6/1998 | Srinivasan et al. |
| 5,767,208 A | 6/1998 | Turner et al. |
| 5,840,389 A | 11/1998 | Asanuma et al. |
| 5,840,808 A | 11/1998 | Sugimura et al. |
| 5,844,045 A | 12/1998 | Kolthammer et al. |
| 5,869,575 A | 2/1999 | Kolthammer et al. |
| 5,869,584 A | 2/1999 | Winter et al. |
| 5,874,505 A | 2/1999 | Saito et al. |
| 5,883,188 A | 3/1999 | Hwang et al. |
| 5,883,204 A | 3/1999 | Spencer et al. |
| 5,891,976 A | 4/1999 | Costa et al. |
| 5,907,021 A | 5/1999 | Turner et al. |
| 5,910,224 A | 6/1999 | Morman |
| 5,919,983 A | 7/1999 | Rosen et al. |
| 5,922,822 A | 7/1999 | Wilson et al. |
| 5,929,147 A | 7/1999 | Pierick et al. |
| 5,936,053 A | 8/1999 | Fukuoka et al. |
| 5,945,496 A | 8/1999 | Resconi et al. |
| 5,959,046 A | 9/1999 | Imuta et al. ............... 526/127 |
| 5,962,714 A | 10/1999 | McCullough et al. |
| 5,965,677 A | 10/1999 | Stephan et al. |
| 5,965,756 A | 10/1999 | McAdon et al. |
| 5,972,822 A | 10/1999 | Timmers et al. |
| 5,977,251 A | 11/1999 | Kao et al. |
| 5,994,482 A | 11/1999 | Georgellis et al. |
| 5,998,039 A | 12/1999 | Tanizaki et al. |
| 6,001,933 A | 12/1999 | Tsuruoka et al. |
| 6,005,049 A | 12/1999 | Rebhan et al. |
| 6,013,819 A | 1/2000 | Stevens et al. |
| 6,015,868 A | 1/2000 | Nickias et al. |
| 6,034,021 A | 3/2000 | Wilson et al. |
| 6,034,240 A | 3/2000 | La Pointe |
| 6,037,417 A | 3/2000 | Nguyen et al. |
| 6,043,363 A | 3/2000 | LaPointe et al. |
| 6,048,950 A | 4/2000 | Dolle et al. |
| 6,074,977 A | 6/2000 | Rosen et al. |
| 6,103,657 A | 8/2000 | Murray |
| 6,111,046 A | 8/2000 | Resconi et al. |
| 6,117,962 A | 9/2000 | Weng et al. |
| 6,140,442 A | 10/2000 | Knight et al. |

| | | |
|---|---|---|
| 6,150,297 A | 11/2000 | Campbell, Jr. et al. |
| 6,153,702 A | 11/2000 | Somers |
| 6,153,703 A | 11/2000 | Lustiger et al. |
| 6,156,846 A | 12/2000 | Tsuruoka et al. |
| 6,162,887 A | 12/2000 | Yamada et al. |
| 6,169,151 B1 | 1/2001 | Waymouth et al. |
| 6,176,952 B1 | 1/2001 | Maugans et al. |
| 6,190,768 B1 | 2/2001 | Turley et al. |
| 6,197,886 B1 | 3/2001 | Chatterjee et al. |
| 6,207,756 B1 | 3/2001 | Datta et al. |
| 6,211,300 B1 | 4/2001 | Terano et al. |
| 6,225,243 B1 | 5/2001 | Austin |
| 6,245,856 B1 | 6/2001 | Kaufman et al. |
| 6,248,829 B1 | 6/2001 | Fischer et al. |
| 6,251,997 B1 | 6/2001 | Imai et al. |
| 6,265,513 B1 | 7/2001 | Murray et al. |
| 6,268,063 B1 | 7/2001 | Kaminaka et al. |
| 6,268,444 B1 | 7/2001 | Klosin et al. |
| 6,268,447 B1 | 7/2001 | Murray et al. |
| 6,274,678 B1 | 8/2001 | Shinozaki et al. |
| 6,284,857 B1 | 9/2001 | Shinozaki et al. |
| 6,303,719 B1 | 10/2001 | Murray et al. |
| 6,306,973 B1 | 10/2001 | Takaoka et al. |
| 6,313,226 B1 | 11/2001 | Yasaka et al. |
| 6,319,991 B1 | 11/2001 | Okayama et al. |
| 6,320,002 B1 | 11/2001 | Murray et al. |
| 6,320,005 B1 | 11/2001 | Murray |
| 6,320,009 B1 | 11/2001 | Nakano et al. |
| 6,323,389 B1 | 11/2001 | Thomas et al. |
| 6,326,432 B1 | 12/2001 | Fujita et al. |
| 6,340,730 B1 | 1/2002 | Murray et al. |
| 6,342,564 B1 | 1/2002 | Pitkanen et al. |
| 6,342,565 B1 | 1/2002 | Cheng et al. |
| 6,342,566 B1 | 1/2002 | Burkhardt et al. |
| 6,355,725 B1 | 3/2002 | Terano et al. |
| 6,372,847 B1 | 4/2002 | Wouters |
| 6,388,040 B1 | 5/2002 | Fujita et al. ............... 526/348 |
| 6,403,708 B1 | 6/2002 | Moriya et al. |
| 6,423,782 B1 | 7/2002 | Yukimasa et al. |
| 6,448,341 B1 | 9/2002 | Kolthammer et al. |
| 6,515,155 B1 | 2/2003 | Klosin et al. |
| 6,525,157 B1 | 2/2003 | Cozewith et al. ............ 526/348 |
| 6,552,149 B1 | 4/2003 | Alastalo et al. ........... 526/348.6 |
| 6,635,715 B1 | 10/2003 | Datta et al. ................... 525/240 |
| 6,642,316 B1 | 11/2003 | Datta et al. ................... 525/240 |
| 6,867,260 B1 | 3/2005 | Datta et al. ................... 525/191 |
| 6,921,794 B1 | 7/2005 | Cozewith et al. ............ 525/240 |
| 6,927,258 B1 | 8/2005 | Datta et al. ................... 525/240 |
| 2001/0021732 A1 | 9/2001 | Terano et al. |
| 2001/0034411 A1 | 10/2001 | Burkhardt et al. |
| 2001/0034426 A1 | 10/2001 | Waymouth et al. |
| 2001/0039314 A1 | 11/2001 | Mehta et al. |
| 2002/0004575 A1 | 1/2002 | Cozewith et al. |
| 2002/0006993 A1 | 1/2002 | Shinozaki et al. |
| 2002/0019507 A1 | 2/2002 | Karandinos et al. |
| 2002/0035210 A1 | 3/2002 | Silvestri et al. |
| 2002/0062011 A1 | 5/2002 | Campbell, Jr. et al. |
| 2002/0137845 A1 | 9/2002 | Boussie et al. |
| 2002/0142912 A1 | 10/2002 | Boussie et al. |
| 2002/0147288 A1 | 10/2002 | Boussie et al. |
| 2002/0151662 A1 | 10/2002 | Campbell, Jr. et al. |
| 2002/0156279 A1 | 10/2002 | Boussie et al. |
| 2002/0165329 A1 | 11/2002 | Klosin et al. |
| 2002/0173419 A1 | 11/2002 | Boussie et al. |
| 2002/0177711 A1 | 11/2002 | LaPointe et al. |
| 2003/0004286 A1 | 1/2003 | Klosin et al. |
| 2004/0014896 A1 | 1/2004 | Datta et al. ................... 525/240 |
| 2004/0236026 A1 | 11/2004 | Datta et al. ................... 525/240 |
| 2004/0236042 A1 | 11/2004 | Datta et al. ................... 526/126 |
| 2005/0043489 A1 | 2/2005 | Datta et al. ................... 525/240 |
| 2005/0113522 A1 | 5/2005 | Datta et al. ................... 525/240 |
| 2005/0131150 A1 | 6/2005 | Datta et al. ................... 525/191 |
| 2005/0131155 A1 | 6/2005 | Cozewith et al. ............ 525/192 |
| 2005/0131157 A1 | 6/2005 | Datta et al. ................... 525/240 |
| 2005/0137343 A1 | 6/2005 | Datta et al. ................... 525/240 |
| 2005/0159553 A1 | 7/2005 | Cozewith et al. ............ 525/192 |
| 2005/0171285 A1 | 8/2005 | Cozewith et al. ............ 525/192 |
| 2005/0197461 A1 | 9/2005 | Datta et al. ................... 525/240 |
| 2005/0203252 A1 | 9/2005 | Datta et al. ................... 525/240 |
| 2005/0209405 A1 | 9/2005 | Datta et al. ................... 525/240 |
| 2005/0209406 A1 | 9/2005 | Datta et al. ................... 525/240 |
| 2005/0209407 A1 | 9/2005 | Datta et al. ................... 525/240 |
| 2005/0282963 A1 | 12/2005 | Datta et al. ................... 525/240 |
| 2005/0282964 A1 | 12/2005 | Datta et al. ................... 525/240 |
| 2005/0288444 A1 | 12/2005 | Datta et al. ................... 525/240 |
| 2006/0004145 A1 | 1/2006 | Datta et al. ................... 525/240 |
| 2006/0004146 A1 | 1/2006 | Datta et al. ................... 525/240 |
| 2006/0025531 A1 | 2/2006 | Datta et al. ................... 525/240 |

FOREIGN PATENT DOCUMENTS

| | | |
|---|---|---|
| EP | 0 128 046 | 12/1984 |
| EP | 128 046 | 12/1984 |
| EP | 0 229 476 | 7/1987 |
| EP | 0 277 003 | 8/1988 |
| EP | 0 277 003 A1 | 8/1988 |
| EP | 0 277 004 | 8/1988 |
| EP | 0 302 424 | 2/1989 |
| EP | 0 369 658 B1 | 5/1990 |
| EP | 0 374 695 | 6/1990 |
| EP | 374 695 | 6/1990 |
| EP | 0 426 637 | 5/1991 |
| EP | 0 427 697 | 5/1991 |
| EP | 426 637 A2 | 5/1991 |
| EP | 0 468 537 A1 | 1/1992 |
| EP | 0 468 651 A1 | 1/1992 |
| EP | 0 480 190 | 4/1992 |
| EP | 0 890 584 A1 | 4/1992 |
| EP | 0 495 375 | 7/1992 |
| EP | 0 496 260 B1 | 7/1992 |
| EP | 495 375 A2 | 7/1992 |
| EP | 0 514 828 A1 | 11/1992 |
| EP | 0 515 203 A2 | 11/1992 |
| EP | 0 515 203 A3 | 11/1992 |
| EP | 0 520 732 | 12/1992 |
| EP | 520 732 | 12/1992 |
| EP | 0 538 749 | 4/1993 |
| EP | 0 546 690 | 6/1993 |
| EP | 0 550 214 | 7/1993 |
| EP | 550 214 | 7/1993 |
| EP | 0 573 403 | 12/1993 |
| EP | 573 403 | 12/1993 |
| EP | 0 582 194 | 2/1994 |
| EP | 0 593 083 A1 | 4/1994 |
| EP | 0 628 343 A1 | 12/1994 |
| EP | 629 631 | 12/1994 |
| EP | 629 632 | 12/1994 |
| EP | 0 646 624 | 4/1995 |
| EP | 0 695 765 | 4/1995 |
| EP | 0 651 012 B1 | 5/1995 |
| EP | 0 480 190 B1 | 6/1995 |
| EP | 0 651 773 A1 | 6/1995 |
| EP | 0 663 422 A2 | 7/1995 |
| EP | 695 765 | 7/1995 |
| EP | 0 676 421 A1 | 10/1995 |
| EP | 0 683 176 A1 | 11/1995 |
| EP | 0 692 500 A1 | 1/1996 |
| EP | 0 697 420 A1 | 2/1996 |
| EP | 0 699 213 B1 | 3/1996 |
| EP | 0 374 695 | 6/1996 |
| EP | 0 716 121 | 6/1996 |
| EP | 0 716 121 A1 | 6/1996 |
| EP | 0 721 798 A2 | 7/1996 |
| EP | 0 728 150 B1 | 8/1996 |
| EP | 0 728 151 B1 | 8/1996 |
| EP | 0 728 771 A1 | 8/1996 |

| | | |
|---|---|---|
| EP | 0 728 772 A1 | 8/1996 |
| EP | 0 735 058 A1 | 10/1996 |
| EP | 0 748 846 A2 | 12/1996 |
| EP | 0 721 798 A3 | 1/1997 |
| EP | 0 748 846 A3 | 2/1997 |
| EP | 0 780 404 A2 | 6/1997 |
| EP | 0 796 884 | 9/1997 |
| EP | 0 780 404 A3 | 12/1997 |
| EP | 0 844 280 A1 | 5/1998 |
| EP | 0 890 584 | 1/1999 |
| EP | 0 949 278 A2 | 10/1999 |
| EP | 0 949 279 A2 | 10/1999 |
| EP | 0 949 278 A3 | 9/2000 |
| EP | 0 949 279 A3 | 9/2000 |
| EP | 1 063 244 A2 | 12/2000 |
| GB | 1 342 647 | 1/1974 |
| JP | 62-121707 | 6/1987 |
| JP | 62-119212 | 6/1994 |
| JP | 1997012635 A | 1/1997 |
| WO | WO 87/02991 | 5/1987 |
| WO | WO 88/05792 A1 | 8/1988 |
| WO | WO 88/05793 A1 | 8/1988 |
| WO | WO 90/01521 A1 | 2/1990 |
| WO | WO 90/07526 A1 | 7/1990 |
| WO | 427 697 A2 | 5/1991 |
| WO | WO 92/00333 | 1/1992 |
| WO | WO 93/06169 | 4/1993 |
| WO | WO 93/11171 | 6/1993 |
| WO | WO 93/18106 | 9/1993 |
| WO | WO 93/19104 A1 | 9/1993 |
| WO | WO 93/21238 A2 | 10/1993 |
| WO | WO 93/21238 A3 | 10/1993 |
| WO | WO 93/21242 A1 | 10/1993 |
| WO | WO 93/25590 A1 | 12/1993 |
| WO | WO 94/00500 A1 | 1/1994 |
| WO | WO 94/03506 A1 | 2/1994 |
| WO | WO 94/25495 | 11/1994 |
| WO | WO 94/25497 | 11/1994 |
| WO | WO 94/26793 | 11/1994 |
| WO | WO 94/28032 | 12/1994 |
| WO | WO 94/29032 | 12/1994 |
| WO | WO 95/00526 A1 | 1/1995 |
| WO | WO 95/07942 | 3/1995 |
| WO | WO 95/13305 A1 | 5/1995 |
| WO | WO 95/13306 A1 | 5/1995 |
| WO | WO 96/00244 A1 | 1/1996 |
| WO | WO 96/06132 | 2/1996 |
| WO | WO 96/13530 A1 | 5/1996 |
| WO | WO 96/23010 A2 | 8/1996 |
| WO | WO 96/24623 | 8/1996 |
| WO | WO 97/10300 | 3/1997 |
| WO | WO 97/22635 A1 | 6/1997 |
| WO | WO 97/25355 | 7/1997 |
| WO | WO 97/42241 A1 | 11/1997 |
| WO | WO 98/39384 | 9/1998 |
| WO | WO 98 39384 | 9/1998 |
| WO | WO 98/41529 A1 | 9/1998 |
| WO | WO 98/50392 A1 | 11/1998 |
| WO | WO 99/01485 | 1/1999 |
| WO | WO 99/07788 | 2/1999 |
| WO | WO 99/14250 A1 | 3/1999 |
| WO | 1 017 729 A2 | 1/2000 |
| WO | WO 00/01745 A1 | 1/2000 |
| WO | WO 00/59661 A1 | 10/2000 |
| WO | WO 00/69964 A1 | 11/2000 |
| WO | WO 00/69965 A1 | 11/2000 |
| WO | WO 01/74910 A2 | 10/2001 |
| WO | WO 02/38628 A2 | 5/2002 |

OTHER PUBLICATIONS

Hu et al., "Elastomeric Polypropylenes from Unbridged (2-Phenylindene)zirconocene Catalysts: Thermal Characterization and Mechanical Properties," Macromolecules, vol. 31, pp. 6908-6916 (1999).

Cheng, H.No., "C NMR Analysts of Ethylene-Propylene Rubbers," Macromolecules, vol. 17, pp. 1950-1955, (1984).

Tincul et al., "Impact Fracture Toughness of Propylene/1-Pentene Random Copolymers," Polymer Material Sci. Eng., PMSEDG 79, pp. 190-191, (1998).

Strate et al., "Near Monodisperse Ethylene-Propylene Copolymers by Direct Ziegler-Natta Polymerization. Preparation, Characterization, Properties," Macromolecules, v.21(12), pp. 3360-3371, (1988).

Collette et al., "Elastomeric Polypropylenes from Alumina-Supported Tetraalkyl Group IVB Catalysts. 1. Synthesis and Properties of High Molecular Weight Stereoblcok Hopolymers," Macromolecules, vol. 21(12), pp. 3360-3371, (1989).

ASTM D 1646-96a, "Standard Test Methods for Rubber—Viscosity, Stress Relaxation, and Pre-Vulcanization Characteristics (Mooney Viscometer)," American Society for Testing and Materials.

ASTM D 3900-95, "Standard Tests Methods for Rubber Raw-Determination of Ethylene Units in EPM (Ethylene-Propylene Copolymers) and EPDM (Ethylene-Propylene-Diene Teropolymers)" American Society for Testing and Materials.

Lin et al., "Regioirregular Propene Insertion on Polypropenes Synthesized with Unbridged Bis(2-aryl)indenyl Zirconium Dichloride Catalysts: Implications on Activity," Macromolecules, vol. 32, pp. 8283-8290, (1999).

Coates et al., "Oscillating Stereocontrol: A strategy for the Synthesis of Thermoplastic Elastomeric Polypropylene," Science, vol. 267, pp. 217-219, (1995).

Hu et al., "Elastomeric Polypropylenes from Unbridged 2-Phenylindene Zirconocene Catalysts: Temperature Dependence of Crystallinity and Relaxation Properties," Macromolecules, vol. 32, pp. 3334-3340 (1999).

HIPOL, data provided by IDES, Mitsui Chemicals America, Inc. HIPOL™J700, (2003).

"PRO-FAX Polypropylene A General Product Guide," Himont Canada Inc., pp. 1-10.

European Opposition: Notice of Opposition against EP 1 003 814 B1, filed by Dow Chemical Company, Jul. 2, 2003.

European Opposition: Reply Brief filed in response to Dow Chemical Notice of Opposition, filed by ExxonMobil Chemical Patents, Inc., Jun. 11, 2004.

JP translation for Application No. S62-119215, entitled "Propylene-Based Random Co-Polymer and Its Usage", Kokai Patent official Gazette, published May 30, 1987.

U.S. Appl. No. 11/297,870, filed Dec. 9, 2005, entitled "Propylene Alpha-Olefin Polymers" (1997B050/12).

U.S. Appl. No. 11/299,100, filed Dec. 9, 2005, entitled "Propylene Alpha-Olefin Polymers Blends" (1997B050/13).

U.S. Appl. No. 11/297,871, filed Dec. 9, 2005, entitled "Process for Producing Propylene Alpha-Olefin Polymers" (1997B050/14).

U.S. Appl. No. 11/351,186, filed Feb. 9, 2006, entitled "Alpha-Olefin/Propylene Copolymers and Their Use" (1997B050/16).

U.S. Appl. No. 11/350,459, filed Feb. 9, 2006, entitled "Alpha-Olefin/Propylene Copolymers and Their Use" (1997B050/17).

U.S. Appl. No. 11/298,143, filed Dec. 9, 2005, entitled "Propylene Olefin Copolymer" Datta et al. (1998B037A/13).

U.S. Appl. No. 11/298,146, filed Dec. 9, 2005, entitled "Elastic Blends Comprising Crystalline Polymer and Crystallizable Polymers of Propylene" Datta et al: (1998B037A/14).

U.S. Appl. No. 11/352,559, filed Feb. 13, 2006, entitled "Elastic Blends Comprising Crystalline Polymer and Crystallizable Polymers of Propylene" Datta et al. (1998B037A/15).

U.S. Appl. No. 11/352,558, filed Feb. 13, 2006, entitled "Propylene Olefin Copolymer" Datta et al. (1998B037A/16).

Polypropylene Handbook, Polymerization, Characterization, Properties, Processing, Applications, Edward P. Moore, Jr., New York, 1996.

Experimental Report, pp. 1-6, Mar. 29, 2005, Dow Reproduction of Example 6 of EP 0 629 632 A2.

Polyolefines, entitled "High Density Polyethylene", "Linear Low Density Polyethylene/Medium Density Polyethylene", "Low Density Polyethylene", and "Propylene" Mitsui Petrochemical Industries, Ltd., Japan.

Project Report, entitled "Laboratory Studies on the $TiCl_3$-Catalyzed Block Copolymerization of Propylene and Ethylene Using Gas-Phase Spiking and Sequential Monomer Methods", N. M. Golembeski, New Jersey, Sep. 10, 1982.

Opposition Submission to EP 1 003 814, Mar. 24, 2005.

Polymer Engineering and Science, vol. 36, No. 21, entitled Effect of the Crystallinity and Morphology on the Microcellular Foam Structure of Semicrystalline Polymers, Doroudiari et al., pp. 2645-2662, Canada, 1996.

Plastics Edition 8, Thermoplastics and Thermosets, 1986.

JP translation for Application No. S62-121707, entitled "Process for Production of α-Olefin Type Random Copolymers", Tsutsui et al., published Jun. 3, 1987.

Pro-Fax Polypropylene, Himont, Canada (publication date unknown, Dow submitted, Himont existed between Nov. 1984 to Apr. 1995, see "AP reference", p. 4, bottom of page.

JP translation of Publication of Patent Application No. Hei 06(1994)-104698, entitled "Propylene Random Copolymers and Heat-Sealing Modifier for Thermoplastic Resins Containing the Same", Tsutsui et al., published May 30, 1987.

U.S. Appl. No. 11/336,578, filed Jan. 20, 2006, entitled "Blends Made from Propylene Ethylene Polymers" (1998B038E/4).

News Release, Japan Polychem Launches WINTEC Metallocente-Based PP Random Copolymer, Oct. 25, 2001, http://www.m-kagaku.co.jp/english/rel/2001/102501.htm.

Abramovitch, Rudolph A., et al., *J. Org. Chem.*, 1977, 42, 17, 2920-2926.

Alt, Helmut G., et al., *Chem. Rev.*, 2000, 100, 1205-1221.

Brintzinger, Hans H., et al, *Angew Chem. Int. Ed. Engl.*, 1995, 34, 1143-1434.

Chen, Eugene You-Xian, et al., *Chem. Rev.*, 2000, 100, 1391-1434.

Coates, Geoffrey W., *Chem. Rev.*, 2000, 100, 1223-1252.

Hazlitt, Lonnie G., *Journal of Applied Polymer Science: Applied Power Symposium*, 1990, 45, 25-37.

Herzog, Timothy A., et al., *J. Am. Chem. Soc.*, 1996, 118, 11988-11989.

Ittel, Steven D., et al., *Chem. Rev.*, 2000, 100, 1169-1203.

Kaminsky, Walter, et al., *J. Polymer Sci.*, 1985, 23, 2151-2164.

*The Encyclopedia of Chemical Technology*, Kirk-Othmer, Third Edition, John Wiley & Sons, New York, 1981, vol. 16, 415-417.

*The Encyclopedia of Chemical Technology*, Kirk-Othmer, Third Edition, John Wiley & Sons, New York, 1981, vol. 18, 191-192.

Lambert, Joseph B., et al., *J. Chem. Soc., Chem. Commun.*, 1993, 2430-2443.

Lambert, Joseph B., et al., *Organometallics*, 1994, 13, 383-384.

Mathur, Naresh C. et al., *Tetrahedron*, 1985, vol. 41, No. 8, 1509-1516.

Otocka, E.P., et al., *Macromolecules*, Jul.-Aug. 1971, vol. 4, No. 4, 507-514.

Randall, James C., *JMS-Rev. Macromol. Chem. Phys.*, 1989, C29(2 & 3), 201-317.

Resconi, Luigi, et al., *Chem. Rev.*, 2000, 100, 1253-1345.

Scholte, Th. G., et al., *Journal of Applied Polymer Science*, 1984, vol. 29, 3763-3782.

Scollard, John D., et al., *J. Am. Chem. Soc.*, 1996, 118, 10008-10009.

Veghini, Dario, et al., *J. Am. Chem. Soc.*, 1999, 121, 564-573.

Wang, Chunming, et al., *Organometallics*, 1998, vol. 17, No. 15, 3149-3151.

Wild, L. et al., *Journal of Polymer Science Polymer Physics Edition*, 1982, vol. 441-445.

Younkin, Todd R., et al., *Science*, 2000, vol. 287, Issue 5452, 460-462.

Product Sample Report for Escorene PP 4292, Polymer Science Laboratory of the Baytown Polymer Center, Exxon Chemical, May 9, 2000.

ASTM D 1646-96a—"Standard Test Methods for Rubber—Viscosity, Stress Relaxation, and Pre-vulcanizaiton Characteristics (Mooney Viscometer)," *American Society for Testing & Materials, Annual Book of ASTM Standards*, 1997, vol. 09.01, 313-322.

ASTM D 3900-95—"Standard Test Methods for Rubber Raw—Determination of Ethylene Units in EPM (Ethylene-Propylene Copolymers) and EPDM (Ethylene-Propylene-Diene Terpolymers)," *American Society for Testing & Materials, Annual Book of ASTM Standards*, 1997, vol. 09.01, 616-624.

H.N. Cheng, "$^{13}$C NMR Analysis of Ethylene-Propylene Rubbers," *Macromolecules*, 1984, vol. 17, 1950-1955.

G. Ver Strate et al., "Near Monodisperse Ethylene-Propylene Copolymers by Direct Ziegler-Natta Polymerization Properties, Characterization, Propeties," *Macromolecules*, 1988, vol. 21, 360-3371.

J.W. Collette, et al., "Elastomeric Polypropylenes from Alumina-Supported Tetraalkyl Group IVB Catalysts. 1. Synthesis and Properties of High Molecular Weight Stereoblock Hopolymers," *Macromolecules*, 1989, vol. 22, 3851-3858.

W.J. Gauthier, et al., "Elastomeric Poly(propylene): Influence of Catalyst Structure and Polymerization Conditions on Polymer Structure and Properties," *Macromolecules*, 1995, vol. 28, 3771-3778.

Y. Hu et al., "Elastomeric Polypropylenes from Unbridged (2-Phenylindene)zirconocene Catalysts: Thermal Characterization and Mechanical Properties," *Macromolecules*, 1998, vol. 31, 6908-6916.

Y. Hu, et al., "Elastomeric Polypropylenes from Unbridged 2-Phenylindene Zirconocene Catalysts: Temperature Dependence of Crystallinity and Relaxation Properties," *Macromolecules*, 1999, 32, 3334-3340.

E.D. Carlson, et al., "Component Relaxation Processes within Elastomeric Polypropylene," *Macromolecules*, 1999, 32, 8100-8106.

S. Lin, et al., "Regioirregular Propene Insertion in Polypropenes Synthesized with Unbridged Bis(2-aryl)indenyl Zirconium Dichloride Catalysts: Implications on Activity," *Macromolecules*, 1999, 32, 8283-8290.

J. Chien, et al., "Two-State Propagation Mechanism for Propylene Polymerization Catalyzed by rac-[anti-Ethylidene(1-$\eta^5$-tetramethylcyclo-pentadienyl)(1-$\eta^5$-indenyl)dimethyltitanium," *Journal of the American Chemical Society*, 1991, vol. 113, 8569-8570.

E. Hauptman, et al., "Stereoblock Polypropylene: Ligand Effects on the Stereospecificity of 2-Arylindene Zirconocene," *Journal of the American Chemical Society*, 1995, vol. 117, 11586-11587.

M.D. Bruce, et al., "Effect of Metal on the Stereospecificity of 2-Arylindene Catalysts for Elastomeric Polypropylene," *Journal of the American Chemical Society*, 1997, vol. 119, 11174-11182.

Painter et al., entitled "Fundamentals of Polymer Science, An Introductory Text", Second Edition, 1997, Technomic Publishing Company, Pennsylvania, pp. 237-242.

Alfred Rudin, entitled "The Elements of Polymer Science and Enginneering" Second Edition, 1999, Academic Press, San Diego, pp. 384-385.

Malcolm P. Stevens, entitled "Polymer Chemistry, An Introduction" Third Edition, 1999, Oxford University Press, New York, pp. 140-141.

G. W. Coates, et al., "Oscillating Stereocontrol: A Strategy for the Synthesis of Thermoplastic Elastomeric Polypropylene," *Science*, 1995, 267, 217-219.

I. Tincul et al., "Impact Fracture Toughness of Propylene/1-Pentene Random Copolymers," *Proceedings of the American Chemical Society Division of Polymeric Materials: Science and Engineering*, 1998, 79, 190-191.

ALPHA-OLEFIN/PROPYLENE COPOLYMERS AND THEIR USE

CROSS REFERENCE TO RELATED APPLICATIONS

This application is a divisional of Ser. No. 10/613,373, filed Jul. 3, 2003 now U.S. Pat. No. 7,019,081, which is a divisional of Ser. No. 08/910,001, filed Aug. 12, 1997, now U.S. Pat. No. 6,635,715, the disclosures of which are incorporated by reference in their entireties.

FIELD OF THE INVENTION

The invention relates to polymer blends of at least two polymers having surprising properties when compared to the properties of the individual polymers prior to blending. More specifically, the invention relates to blends of thermoplastic polymers, e.g., according to one embodiment, isotactic polypropylene and an olefin copolymer. The invention further relates to thermoplastic polymer blends comprising isotactic polypropylene and, according to one embodiment, a copolymer of ethylene and propylene, wherein the copolymer comprises isotactically crystallizable alpha-olefin sequences. In addition, the invention relates to methods for making the above polymers and blends thereof.

BACKGROUND OF THE INVENTION

Although blends of isotactic polypropylene and ethylene propylene rubber are well known in the prior art, prior art Ziegler-Natta catalyst systems could only produce ethylene propylene rubber compositions with greater than 30% by weight ethylene at practical, economic polymerization conditions. There exists a need for polymeric materials which have advantageous processing characteristics while still providing suitable end properties to articles formed therefrom, e.g., tensile and impact strength. Copolymers and blends of polymers have been developed to try and meet the above needs. U.S. Pat. No. 3,882,197 to Fritz et al. describes blends of stereoregular propylene/alpha-olefin copolymers, stereoregular propylene, and ethylene copolymer rubbers. In U.S. Pat. No. 3,888,949 Chi-Kai Shih, assigned to E I DuPont, shows the synthesis of blend compositions containing isotactic polypropylene and copolymers of propylene and an alpha-olefin, containing between 6–20 carbon atoms, which have improved elongation and tensile strength over either the copolymer or isotactic polypropylene. Copolymers of propylene and alpha-olefin are described wherein the alpha-olefin is hexene, octene or dodecene. However, the copolymer is made with a heterogeneous titanium catalyst which makes copolymers which are non-uniform in compositional distribution and typically broad in molecular weight distribution. Compositional distribution is a property of copolymers where there exists statistically significant intermolecular or intramolecular difference in the composition of the polymer. Methods for measuring compositional distribution are described later. The presence of intramolecular compositional distribution is described in U.S. Pat. No. 3,888,949 by the use of the term "block" in the description of the polymer where the copolymer is described as having "sequences of different alpha-olefin content." Within the context of the invention described above the term sequences describes a number of olefin monomer residues catenated together by chemical bonds and obtained by a polymerization procedure.

In U.S. Pat. No. 4,461,872, A.C.L. Su improved on the properties of the blends described in U.S. Pat. No. 3,888,949 by using another heterogeneous catalyst system. However, the properties and compositions of the copolymer with respect to either the nature and type of monomers (alpha-olefin containing 6–20 carbon atoms) or the blocky heterogeneous intra/inter molecular distribution of the alpha-olefin in the polymer have not been resolved since the catalysts used for these polymerization of propylene and alpha-olefin are expected to form copolymers which have statistically significant intermolecular and intramolecular compositional differences.

In two successive publications in the journal of Macromolecules, 1989, V22, pages 3851–3866, J. W. Collette of E. I. DuPont has described blends of isotactic polypropylene and partially atactic polypropylene which have desirable tensile elongation properties. However, the partially atactic propylene has a broad molecular weight distribution as shown in FIG. 8 of the first publication. The partially atactic polypropylene is also composed of several fractions, which differ in the level of tacticity of the propylene units as shown by the differences in the solubility in different solvents. This is shown by the corresponding physical decomposition of the blend which is separated by extraction with different solvents to yield individual components of uniform solubility characteristics as shown in Table IV of the above publications.

In U.S. Pat. Nos. 3,853,969 and 3,378,606, E. G. Kontos discloses the formation of in situ blends of isotactic polypropylene and "stereo block" copolymers of propylene and another olefin of 2 to 12 carbon atoms, including ethylene and hexene. The copolymers of this invention are necessarily heterogeneous in intermolecular and intramolecular composition distribution. This is demonstrated by the synthesis procedures of these copolymers which involve sequential injection of monomer mixtures of different compositions to synthesize polymeric portions of analogously different compositions. In addition, FIG. 1 of both patents shows that the "stereo block" character, which is intra or intermolecular compositional differences in the context of the description of the present invention, is essential to the benefit of the tensile and elongation properties of the blend. In situ blends of isotactic polypropylene and compositionally uniform random ethylene propylene copolymers have poor properties. Moreover, all of these compositions either do not meet all of the desired properties for various applications, and/or involve costly and burdensome process steps to achieve the desired results.

Similar results are anticipated by R. Holzer and K. Mehnert in U.S. Pat. No. 3,262,992 assigned to Hercules wherein the authors disclose that the addition of a stereoblock copolymer of ethylene and propylene to isotactic polypropylene leads to improved mechanical properties of the blend compared to isotactic polypropylene alone. However, these benefits are described only for the stereoblock copolymers of ethylene and propylene. The synthesis of the these copolymers is designed around polymerization conditions where the polymer chains are generated in different compositions of ethylene and propylene achieved by changing, with time, the monomer concentrations in the reactor. This is shown in examples 1 and 2. The stereoblock character of the polymer is graphically shown in the molecular description (column 2, line 65) and contrasted with the undesirable random copolymer (column 2, line 60). The presence of stereoblock character in these polymers is shown by the high melting point of these polymers, which is much greater than the melting point of the second polymer component in the present invention, shown in Table 1, as well as the poor solubility of these hetero block materials, as a function of the ethylene wt % of the material as shown in Table 3.

It would be desirable to produce a blend of a crystalline polymer, hereinafter referred to as the "first polymer component," and a crystallizable polymer, hereinafter referred to as the "second polymer component", having advantageous processing characteristics while still providing end products made from the blend composition having the desired properties, i.e., increased tensile strength, elongation, and overall toughness. The first polymer component (abbreviated as "FPC" in the Tables below) and the second polymer component (abbreviated as "SPC" in the Tables below). Indeed, there is a need for an entirely polyolefin composition which is thermally stable, heat resistant, light resistant and generally suitable for thermoplastic elastomer (TPE) applications which has advantageous processing characteristics. Such an entirely polyolefin composition would be most beneficial if the combination of the first polymer component and the second polymer component were significantly different in mechanical properties than the compositionally weighted average of the corresponding properties of first polymer component and second polymer component alone. We anticipate, while not meant to be limited thereby, that the potency of the second polymer component may be increased if it only consists of one or two polyolefin copolymers material defined by uniform intramolecular and intermolecular composition and microstructure.

The term "crystalline," as used herein for first polymer component, characterizes those polymers which possess high degrees of inter- and intra-molecular order, and which melt higher than 110° C. and preferably higher than 115° C. and have a heat of fusion of at least 75 J/g, as determined by DSC analysis. And, the term "crystallizable," as used herein for second polymer component, describes those polymers or sequences which are mainly amorphous in the undeformed state, but upon stretching or annealing, crystallization occurs. Crystallization may also occur in the presence of the crystalline polymer such as first polymer component. These polymers have a melting point of less than 105° C. or preferably less than 100° C. and a heat of fusion of less than 75 J/g as determined by DSC.

SUMMARY OF THE INVENTION

The present invention, according to one embodiment, is directed to the use of chiral metallocene catalysts to (1) readily produce second polymer component being ethylene propylene rubber compositions with about 4 wt % to about 25 wt % ethylene, and (2) readily produce second polymer component compositions containing isotactic propylene sequences long enough to crystallize. Thus, the invention is directed, according to one embodiment, to semicrystalline materials (second polymer component), which when blended with isotactic polymers (first polymer component), show an increased level of compatibility between the ethylene propylene and isotactic polypropylene phases. While not meant to be limited thereby, we believe the increased compatibility is due to the similarity of the composition of the first polymer component and all of the second polymer component. Thus, the uniformity of the intra- and intermolecular composition of the second polymer component is of importance. In particular, it is important that substantially all of the components of the second polymer component be within the narrow composition range of ethylene and propylene defined above. In addition, the presence of isotactic propylene sequences in the second polymer component is of benefit for the improved adhesion of the domains of the first polymer component and the second polymer component in the polymer blend composition. As a result, blends of isotactic polypropylene with ethylene propylene copolymers according to the invention, have improved physical properties as compared to isotactic polypropylene blends with prior art ethylene propylene rubbers.

According to one embodiment, a composition of the present invention comprises a blend of at least a first polymer component and a second polymer component. The blend comprises greater than about 2% by weight of the first polymer component comprising an alpha-olefin propylene copolymer containing isotactic polypropylene crystallinity with a melting point of about 115° C. to about 170° C. The blend also contains a second polymer component comprising a copolymer of propylene and at least one other alpha-olefin having less than 6 carbon atoms, and preferably 2 carbon atoms. The second polymer component copolymer of the invention, according to one embodiment, comprises isotactically crystallizable propylene sequences and greater than 75% by weight propylene and preferably greater than 80% by weight propylene.

According to another embodiment, a thermoplastic polymer blend composition of the invention comprises a first polymer component and a second polymer component. The first polymer component comprises isotactic polypropylene, and is present in an amount of about 2% to about 95% by weight and more preferably 2% to 70% by weight of the total weight of the blend. The first polymer component may also be comprised of commonly available isotactic polypropylene compositions referred to as impact copolymer or reactor copolymer. However these variations in the identity of the first polymer component are acceptable in the blend only to the extent that all of the components of the first polymer component are substantially similar in composition and the first polymer component is within the limitations of the crystallinity and melting point indicated above. This first polymer component may also contain additives such as flow improvers, nucleators and antioxidants which are normally added to isotactic polypropylene to improve or retain properties. All of these polymers are referred to as the first polymer component.

The second polymer component is a thermoplastic comprising a random copolymer of ethylene and propylene having a melting point by DSC of 25° C. to 105° C., preferably in the range 25° C. to 90° C., more preferably in the range of 40° C. to 90° C. and an average propylene content by weight of at least 75% and more preferably at least 80%. The second polymer component is made with a polymerization catalyst which forms essentially or substantially isotactic polypropylene when all or substantially all propylene sequences in the second polymer component are arranged isotactically. This copolymer contains crystallizable propylene sequences due to the isotactic polypropylene. The second polymer component is statistically random in the distribution of the ethylene and propylene residues along the chain. Quantitative evaluation of the randomness of the distribution of the ethylene and propylene sequences may be obtained by consideration of the experimentally determined reactivity ratios of the second polymer component. We believe that the second polymer component is random in the distribution of ethylene and propylene sequences since (1) it is made with a single sited metallocene catalyst which allows only a single statistical mode of addition of ethylene and propylene and (2) it is made in a well mixed, continuous monomer feed stirred tank polymerization reactor which allows only a single polymerization environment for substantially all of the polymer chains of the second polymer component. Thus there is substantially no statistically significant difference in the composition of the second polymer component either among two polymer chains or along any one chain.

The ratio of the first polymer component to the second polymer component of the blend composition of the present invention may vary in the range of 2:98 to 95:5 by weight and more preferably in the range 2:98 to 70:30 by weight.

According to another embodiment of the present invention, the second polymer component may contain small quantities of a non-conjugated diene to aid in the vulcanization and other chemical modification of the blend of the first polymer component and the second polymer component. The amount of diene is limited to be no greater than 10 wt % and preferably no greater than 5 wt %. The diene may be selected from the group consisting of those which are used for the vulcanization of ethylene propylene rubbers and preferably ethyldiene norbornene, vinyl norbornene and dicyclopentadiene.

According to still a further embodiment, the invention is directed to a process for preparing thermoplastic polymer blend compositions. The process comprises: (a) polymerizing propylene or a mixture of propylene and one or more monomers selected from $C_2$ or $C_4$–$C_{10}$ alpha olefins in the presence of a polymerization catalyst wherein a substantially isotactic propylene polymer containing at least about 90% by weight polymerized propylene is obtained; (b) polymerizing a mixture of ethylene and propylene in the presence of a chiral metallocene catalyst, wherein a copolymer of ethylene and propylene is obtained comprising up to about 25% by weight ethylene and preferably up to 20% by weight ethylene and containing isotactically crystallizable propylene sequences; and (c) blending the propylene polymer of step (a) with the copolymer of step (b) to form a blend.

DETAILED DESCRIPTION OF THE PREFERRED EMBODIMENTS OF THE INVENTION

The blend compositions of the present invention generally are comprised of two components: (1) a first polymer component comprising isotactic polypropylene, and (2) a second polymer component comprising an alpha-olefin (other than propylene) and propylene copolymer.

The First Polymer Component (FPC)

In accordance with the present invention, the first thermoplastic polymer component (first polymer component), i.e., the polypropylene polymer component may be homopolypropylene, or copolymers of propylene, or some blends thereof. The polypropylene used in the present blends can vary widely in form. For example, substantially isotactic polypropylene homopolymer can be used or the polypropylene can be in the form of a copolymer containing equal to or less than about 10 weight percent of other monomer, i.e., at least about 90% by weight propylene. Further, the polypropylene can be present in the form of a graft or block copolymer, in which the blocks of polypropylene have substantially the same stereoregularity as the propylene-alpha-olefin copolymer, so long as the graft or block copolymer has a sharp melting point above about 110° C. and preferably above 115° C. and more preferably above 130° C., characteristic of the stereoregular propylene sequences. The first polymer component of the present invention is predominately crystalline, i.e., it has a melting point generally greater than about 110° C., preferably greater than about 115° C., and most preferably greater than about 130° C. The propylene polymer component may be a combination of homopolypropylene, and/or random, and/or block copolymers as described herein. When the above propylene polymer component is a random copolymer, the percentage of the copolymerized alpha-olefin in the copolymer is, in general, up to about 9% by weight, preferably about 2% to about 8% by weight, most preferably about 2% to about 6% by weight. The preferred alpha-olefins contain 2 or from 4 to about 12 carbon atoms. The most preferred alpha-olefin is ethylene. One, or two or more alpha-olefins can be copolymerized with propylene.

Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

The thermoplastic polymer blend compositions of the present invention may comprise from about 2% to about 95% by weight of first polymer component. According to a preferred embodiment, the thermoplastic polymer blend composition of the present invention may comprise from about 2% to about 70% by weight of the first polymer component. According to the most preferred embodiment, the compositions of the present invention may comprise from about 5% to about 70% by weight of the first polymer component.

There is no particular limitation on the method for preparing this propylene polymer component of the invention. However, in general, the polymer is a propylene homopolymer obtained by homopolymerization of propylene in a single stage or multiple stage reactor. Copolymers may be obtained by copolymerizing propylene and an alpha-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

The Second Polymer Component (SPC)

The second polymer component of the polymer blend compositions of the present invention comprises a copolymer of propylene and another alpha-olefin having less than 6 carbon atoms, preferably ethylene. Optionally, the second component of the composition of the present invention may further comprise, in addition to the above mentioned, amounts of a diene. The second polymer component of the present inventive composition preferably, according to one embodiment, comprises a random copolymer having a narrow compositional distribution. While not meant to be limited thereby, it is believed that the narrow composition distribution of the second polymer component is important. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as a one or two adjacent, soluble fraction with the balance of the polymer in immediately preceding or succeeding fractions. Each of these fractions has a composition (wt % ethylene content) with a difference of no greater than 20 wt. % (relative) and more preferably 10 wt % (relative) of the average wt % ethylene content of the whole second polymer component. The second polymer component is narrow in compositional distribution if it meets the fractionation test outlined above.

In all second polymer component, the number and distribution of ethylene residues is consistent with the random statistical polymerization of ethylene, propylene and optional amounts of diene. In stereoblock structures, the number of monomer residues of any one kind adjacent to one another is greater than predicted from a statistical distribution in random copolymers with a similar composition. Historical polymers with stereoblock structure have a distribution of ethylene residues consistent with these blocky structures rather than a random statistical distribution of the monomer residues in the polymer. The intramolecular composition distribution of the polymer may be determined by C-13 NMR which locates the ethylene residues in relation to the neighboring propylene residue. A more practical and consistent evaluation of the randomness of the distribution of the ethylene and propylene sequences may be obtained by the following consideration. We believe that the second polymer component is random in the distribution of ethylene and propylene sequences since (1) it is made with a single sited metallocene catalyst which allows only a single statistical mode of addition of ethylene and propylene and (2) it is made in a well mixed, continuous monomer feed stirred tank polymerization reactor which allows only a single polymerization environment for substantially all of the polymer chains of the second polymer component.

The second polymer component preferably, according to one embodiment of the invention, has a single melting point. The melting point is determined by DSC. Generally, the copolymer second component of the present invention has a melting point below the first polymer component of the blend typically between about 105° C. and 25° C. Preferably, the melting point of second polymer component is between about 90° C. and 25° C. Most preferably, according to one embodiment of the present invention, the melting point of the second polymer component of the composition of the present invention is between 90° C. and 40° C.

The second polymer component preferably has a narrow molecular weight distribution (MWD) between about 1.8 to about 5.0, with a MWD between about 2.0 to about 3.2 preferred.

The second polymer component of the present inventive composition comprises isotactically crystallizable alpha-olefin sequences, e.g., preferably propylene sequences (NMR). The crystallinity of the second polymer component is, preferably, according to one embodiment, from about 2% to about 65% of homoisotactic polypropylene, preferably between 5% to 40%, as measured by the heat of fusion of annealed samples of the polymer.

According to another embodiment of the present invention, the second polymer component of the composition comprises from about 5% to about 25% by weight alpha-olefin, preferably from about 6% to about 20% by weight alpha-olefin, and most preferably, it comprises from about 6% to about 18% by weight alpha-olefin and even more preferably between 10% to 16% by alpha-olefin. These composition ranges for the second polymer component are dictated by the object of the present invention. At alpha-olefin compositions lower than the above lower limits for the second polymer component, the blends of the first polymer component and second polymer component are hard and do not have the favorable elongation properties of the blends of the present invention. At alpha-olefin compositions higher than the above higher limits for the second polymer component, the blends of the second polymer component and the first polymer component do not have the favorable tensile properties of the blends of the present invention. It is believed, while not meant to be limited thereby, the second polymer component needs to have the optimum amount of isotactic polypropylene crystallinity to crystallize with the first polymer component for the beneficial effects of the present invention. As discussed above, the preferred alpha-olefin is ethylene.

The compositions of the present invention may comprise from about 5% to about 98% by weight of the second polymer component. According to one preferred embodiment, the compositions of the present invention may comprise from about 30% to about 98% by weight of the second polymer component. Most preferably, the compositions of the present invention comprise from about 30% to about 95% by weight of the second polymer component.

Generally, without limiting in any way the scope of the invention, one means for carrying out a process of the present invention for the production of the copolymer second polymer component is as follows: (1) liquid propylene is introduced in a stirred-tank reactor, (2) the catalyst system is introduced via nozzles in either the vapor or liquid phase, (3) feed ethylene gas is introduced either into the vapor phase of the reactor, or sparged into the liquid phase as is well known in the art, (4) the reactor contains a liquid phase composed substantially of propylene, together with dissolved alpha-olefin, preferably ethylene, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene (or other alpha-olefin) content of the polymer product is determined by the ratio of ethylene to propylene in the reactor, which is controlled by manipulating the relative feed rates of these components to the reactor.

For example, a typical polymerization process consists of a polymerization in the presence of a catalyst comprising a bis (cyclopentadienyl) metal compound and either 1) a non-coordinating compatible anion activator, or 2) an alumoxane activator. According to one embodiment of the invention, this comprises the steps of contacting ethylene and propylene with a catalyst in a suitable polymerization diluent, said catalyst comprising, for example, according to a preferred embodiment, a chiral metallocene catalyst, e.g., a bis (cyclopentadienyl) metal compound, as described in U.S. Pat. No. 5,198,401 which is herein incorporated by reference for purposes of U.S. practices and an activator. The activator used may be an alumoxane activator or a non-coordination compatible anion activator. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 1:1. The above polymerization reaction is conducted by reacting such monomers in the presence of such catalyst system at a temperature of from about −100° C. to about 300° C. for a time of from about 1 second to about 10 hours to produce a copolymer having a weight average molecular weight of from about 5,000 or less to about 1,000,000 or more and a molecular weight distribution of from about 1.8 to about 4.5.

While the process of the present invention includes utilizing a catalyst system in the liquid phase (slurry, solution, suspension or bulk phase or combination thereof), according to other embodiments, high pressure fluid phase or gas phase polymerization can also be utilized. When utilized in a gas phase, slurry phase or suspension phase polymerization, the catalyst systems will preferably be supported catalyst systems. See, for example, U.S. Pat. No. 5,057,475 which is incorporated herein by reference for purposes of U.S. practice. Such catalyst systems can also include other well known additives such as, for example, scavengers. See, for example, U.S. Pat. No. 5,153,157 which is incorporated herein by reference for purposes of U.S. practices. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene copolymer of the desired molecular weight and composition.

It is understood in the context of the present invention that, in one embodiment, more than one second polymer component may be used in a single blend with a first polymer component. Each of the second polymer component components is described above and the number of second polymer component in this embodiment is less than three and more preferably, two. In this embodiment of the invention the second polymer components differ in the alpha-olefin content with one being in the range of 5 wt % to 9 wt % alpha-olefin while the other is in the range of 10 wt % to 22 wt % alpha-olefin. The preferred alpha-olefin is ethylene. It is believed that the use of two second polymer component in conjunction with a single first polymer component leads to beneficial improvements in the tensile-elongation properties of the blends The Blend of First and Second Polymer Components The copolymer blends of first polymer component and second polymer component of the instant invention may be prepared by any procedure that guarantees the intimate admixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending. Blending at a temperature of about 180° C. to 240° C. in a Brabender Plastograph for about 1 to 20 minutes has been found satisfactory. Still another method that may be used for admixing the components involves blending the polymers in a Banbury internal mixer above the flux temperature of all of the components, e.g., 180° C. for about 5 minutes. The complete admixture of the polymeric components is indicated by the narrowing of the crystallization and melting transitions characteristic of the polypropylene crystallinity of the components to give a single or a small range crystallization and melting points for the blend. These batch mixing procedures are typically supplanted by continuous mixing processes in the industry. These processes are well known in the art and include single and twin screw mixing extruders, static mixers for mixing molten polymer streams of low viscosity, impingement mixers, as well as other machines and processes, designed to disperse the first polymer component and the second polymer component in intimate contact.

The polymer blends of the instant invention exhibit a remarkable combination of desirable physical properties. The incorporation of as little as 5% first polymer component in the propylene/alpha-olefin copolymers increases the propylene sequence melting point or the polymer softening point but, more significantly, reduces the range as compared to the propylene/alpha-olefin copolymer. In addition, the incorporation of first polymer component in accordance with the instant invention nearly eliminates the stickiness caused by the propylene/alpha-olefin copolymer. Further, the thermal characteristics of the copolymer blends are markedly improved over those of the second polymer component which is the propylene/alpha-olefin copolymers.

The crystallization temperature and the melting point of the blends are changed as a result of the blending operation. In an embodiment of the invention, the blend of first polymer component and second polymer component has single crystallization temperature and melting point. These temperatures are higher than the corresponding temperatures for the second polymer component and close to that of the first polymer component. In other embodiments, the second polymer component and the first polymer component have distinct melting and crystallization temperatures but have these temperatures closer together than would be expected for a combination of the second polymer component and the first polymer component. In all these cases the glass transition temperature of the second polymer component is retained in the polymer blend. This favorable combination of thermal properties permits their satisfactory use in injection molding operations without the orientation previously encountered. Injection molded articles prepared from the instant copolymer blends accordingly exhibit excellent long term dimensional stability. The advantages referred to above are obtained without the need of elaborate purification of the propylene/alpha-olefin copolymer or the tedious preparation of a carefully structured block copolymer. Further, by the use of the second polymer component and the first polymer component, a blend can be obtained with a lower glass transition temperature than would be expected for a random copolymer of the same composition as the blend. In particular, the glass transition temperature of the blend is closer to that of the second polymer component and lower than the glass transition temperature of the first polymer component. This can be accomplished without an exceptionally high alpha-olefin content in the polymer blend which we believe, while not meant to be limited thereby, would lead to degradation of the tensile-elongation properties of the blend.

The mechanism by which the desirable characteristics of the present copolymer blends are obtained is not fully understood. However, it is believed to involve a co-crystallization phenomenon between propylene sequences of similar stereoregularity in the various polymeric components, which results in one embodiment, a single crystallization temperature and a single melting temperature of the copolymer blend which is higher than those of the second polymer component which is the propylene/alpha-olefin component of the blend. In another embodiment, the combination of the first polymer component and the second polymer component has a melting point closer together than would be expected on a comparison of the properties of the individual components alone. It is surprising that in the one embodiment, the blend has a single crystallization temperature and a single melting temperature, since it would be expected by those skilled in the art that the blending of two crystalline polymers would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/alpha-olefin copolymer, thus measurably increasing its commercial utility and range of applications.

While the above discussion has been limited to the description of the invention in relation to having only components one and two, as will be those skilled in the art, the polymer blend compositions of the present invention may comprise other additives. Various additives may be present in the composition of the invention to enhance a specific property or may be present as a result of processing of the individual components. Additives which may be incorporated include, for example, fire retardants, antioxidants, plasticizers, and pigments. Other additives which may be employed to enhance properties include antiblocking agents, coloring agents, stabilizers, and oxidative-, thermal-, and ultraviolet-light-inhibitors. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

As used herein, Mooney Viscosity was measured as ML (1+4) at 125° C. in Mooney units according to ASTM D11646.

The composition of Ethylene propylene copolymers, which are used as comparative examples, was measured as ethylene Wt % according to ASTM D 3900.

The composition of the second polymer component was measured as ethylene Wt % according to the following technique. A thin homogeneous film of the second polymer component, pressed at a temperature of about or greater than 150° C. was mounted on a Perkin Elmer PE 1760 infra red spectrophotometer. A full spectrum of the sample from 600 cm-1 to 400 cm-1 was recorded and the ethylene Wt % of the second polymer component was calculated according to Equation 1 as follows:

$$\text{ethylene Wt \%} = 82.585 - 111.987X + 30.045X^2$$

wherein X is the ratio of the peak height at 1155 cm$^{-1}$ and peak height at either 722 cm$^{-1}$ or 732 cm$^{-1}$, which ever is higher.

Techniques for determining the molecular weight (Mn and Mw) and molecular weight distribution (MWD) are found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al) (which is herein incorporated by reference for purposes of U.S. practice) and references cited therein.

The procedure for Differential Scanning Calorimetry is described as follows. About 6 to 10 mg of a sheet of the polymer pressed at approximately 200° C. to 230° C. is removed with a punch die. This is annealed at room temperature for 80 to 100 hours. At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. The thermal output is recorded as the area under the melting peak of the sample which is typically peaked at about 30° C. to about 175° C. and occurs between the temperatures of about 0° C. and about 200° C. is measured in Joules as a measure of the heat of fusion. The melting point is recorded as the temperature of the greatest heat absorption within the range of melting of the sample. Under these conditions, the melting point of the second polymer component and the heat of fusion is lower than the first polymer component as outlined in the description above.

Composition distribution of the second polymer component was measured as described below. About 30 gms. of the second polymer component was cut into small cubes about ⅛" on the side. This is introduced into a thick walled glass bottle closed with screw cap along with 50 mg of Irganox 1076, an antioxidant commercially available from Ciba-Geigy Corporation. Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the second polymer component soluble at 40° C., 48° C., 55° C. and 62° C. are obtained at temperature increases of approximately 8° C. between stages. Further, increases in temperature to 95° C. can be accommodated, if heptane, instead of hexane, is used as the solvent for all temperatures above about 60° C. The soluble polymers are dried, weighed and analyzed for composition, as wt % ethylene content, by the IR technique described above. Soluble fractions obtained in the adjacent temperature increases are the adjacent fractions in the specification above.

EPR in the data tables below is Vistalon 457, sold by the Exxon Chemical Company, Houston Tex.

The invention, while not meant to be limited thereby, is further illustrated by the following specific examples:

EXAMPLES

Example 1

Ethylene/Propylene Copolymerization to Form the Second Polymer Component

Polymerizations were conducted in a 1 liter thermostatted continuous feed stirred tank reactor using hexane as the solvent. The polymerization reactor was full of liquid. The residence time in the reactor was typically 7–9 minutes and the pressure was maintained at 400 kpa. Hexane, ethene and propene were metered into a single stream and cooled before introduction into the bottom of the reactor. Solutions of all reactants and polymerization catalysts were introduced continuously into the reactor to initiate the exothermic polymerization. Temperature of the reactor was maintained at 41° C. by changing the temperature of the hexane feed and by circulating water in the external jacket. For a typical polymerization, the temperature of feed was about 0° C.

Ethene was introduced at the rate of 45 gms/min and propene was introduced at the rate of 480 gms/min. The polymerization catalyst, dimethyl silyl bridged bis-indenyl Hafnium dimethyl activated 1:1 molar ratio with N',N'-Dimethyl anilinium-tetrakis(pentafluorophenyl)borate was introduced at the rate of 0.00897 gms/hr. A dilute solution of triisobutyl aluminum was introduced into the reactor as a scavenger of catalyst terminators: a rate of approximately 28.48 mol of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The rate of formation of the polymer was 285.6 gms/hr. The polymer produced in this polymerization had an ethylene content of 13%, ML@125 (1+4) of 12.1 and had isotactic propylene sequences.

Variations in the composition of the polymer were obtained principally by changing the ratio of ethene to propene. Molecular weight of the polymer could be increased by a greater amount of ethene and propene compared to the amount of the polymerization catalyst. Dienes such as norbornene and vinyl norbornene could be incorporated into the polymer by adding them continuously during polymerization.

Example 2

Comparative Ethylene/Propylene Polymerization where the Propylene Residues are Atactic Polymerizations were conducted in a 1 liter thermostatted continuous feed stirred tank reactor using hexane as the solvent. The polymerization reactor was full of liquid. The residence time in the reactor was typically 7–9 minutes and the pressure was maintained at 400 kpa. Hexane, ethene and propene were metered into a single stream and cooled before introduction into the bottom of the reactor. Solutions of all reactants and polymerization catalysts were introduced continuously into the reactor to initiate the exothermic polymerization. Temperature of the reactor was maintained at 45° C. by changing the temperature of the hexane feed and by using cooling water in the external reactor jacket. For a typical polymerization, the temperature of feed was about −10° C. Ethene was introduced at the rate of 45 gms/min and propene was introduced at the rate of 310 gms/min. The polymerization catalyst, dimethyl silyl bridged (tetramethylcyclopentadienyl) cyclododecylamido titanium dimethyl activated 1:1 molar ratio with N',N'-Dimethyl anilinium-tetrakis(pentafluorophenyl)borate was introduced at the rate of 0.002780 gms/hr. A dilute solution of triisobutyl aluminum was introduced into the reactor as a scavenger of catalyst terminators: a rate of approximately 36.8 mole per mole of catalyst was adequate for this polymerization. After five residence times of steady polymerization, a representative sample of the polymer produced in this polymerization was collected. The solution of the polymer was withdrawn from the top, and then steam distilled to isolate the polymer. The rate of formation of the polymer was 258 gms/hr. The polymer produced in this polymerization had an ethylene content of 14.1 wt %, ML@125 (1+4) of 95.4.

Variations in the composition of the polymer were obtained principally by changing the ratio of ethene to propene. Molecular weight of the polymer could be increased by a greater amount of ethene and propene compared to the amount of the polymerization catalyst. These polymers are described as aePP in the Tables below.

Example 3

Analysis and Solubility of Several Second Polymer Components

In the manner described in Example 1 above, several second polymer components of the above specification were synthesized. These are described in the table below. Table 1 describes the results of the GPC, composition, ML and DSC analysis for the polymers.

TABLE 1

| SPC | (Mn) by GPC | (Mw) by GPC | Ethylene wt % by IR | Heat of fusion J/g | Melting Point by DSC (° C.) | ML (1 + 4)@1 25° C. |
|---|---|---|---|---|---|---|
| SPC-1 | 102000 | 248900 | 7.3 | 71.9 | 84.7 | 14 |
| SPC-2 | 124700 | 265900 | 11.6 | 17.1 | 43.0 | 23.9 |
| SPC-3 | 121900 | 318900 | 16.4 | 7.8 | 42.2 | 33.1 |
| SPC-4 | | | 11.1 | 25.73 | 63.4 | 34.5 |
| SPC-5 | | | 14.7 | 13.2 | 47.8 | 38.4 |
| Comparative Polymers | | | | | | |
| EPR | | | 47.8 | not detected | not detected | 40 |
| aePP | | | 11.7 | not detected | not detected | 23 |

Table 1: Analysis of the second polymer component and the comparative polymers

Table 2 describes the solubility of the second polymer component

TABLE 2

| SPC | Wt. % soluble at 23° C. | Wt. % soluble at 31° C. | Wt. % soluble at 40° C. | Wt. % soluble at 48° C. |
|---|---|---|---|---|
| SPC-1 | 1.0 | 2.9 | 28.3 | 68.5 |
| SPC-2 | 6.5 | 95.7 | | |
| SPC-3 | 51.6 | 52.3 | 2.6 | |
| SPC-4 | 18.7 | 83.6 | | |
| SPC-5 | 36.5 | 64.2 | | |
| Comparative Polymers | | | | |
| EPR | 101.7 | | | |
| aePP | 100.5 | | | |

Table 2: Solubility of fractions of the second polymer component. Sum of the fractions add up to slightly more than 100 due to imperfect drying of the polymer fractions.

Table 3 describes the composition of the fractions of the second polymer component obtained in Table 2. Only fractions which have more than 4% of the total mass of the polymer have been analyzed for composition.

TABLE 3

Composition: Wt% ethylene in fraction

| SPC | soluble at 23° C. | soluble at 31° C. | soluble at 40° C. | soluble at 48° C. | soluble at 56° C. |
|---|---|---|---|---|---|
| SPC-1 | | | 8.0 | 7.6 | |
| SPC-2 | 12.0 | 11.2 | | | |
| SPC-3 | 16.8 | 16.5 | | | |
| SPC-4 | 13.2 | 11.2 | | | |
| SPC-5 | 14.9 | 14.6 | | | |
| Comparative | | | | | |
| EPR | 46.8 | | | | |
| atactic ePP | 11.8 | | | | |

Table 3: Composition of fractions of the second polymer component obtained in Table 2. The experimental inaccuracy in determination of the ethylene content is believed to about 0.4 wt % absolute

Example 4

A total of 72 g of a mixture of the first polymer component and the second polymer component, as shown in the Table 4, column 2, were mixed in a Brabender intensive mixture for 3 minutes at a temperature controlled to be within 185° C. and 220° C. High shear roller blades were used for the mixing and approximately 0.4 g of Irganox-1076, an antioxidant available from the Novartis Corporation, was added to the blend. At the end of the mixing, the mixture was removed and pressed out into a 6"×6" mold into a pad 025" thick at 215° C. for 3 to 5 minutes. At the end of this period, the pad was cooled and removed and allowed to anneal for 3 to 5 days. Test specimens of the required dumbbell geometry were removed from this pad and evaluated on an Instron tester to produce the data shown in Table 4.

The first polymer component was Escorene 4292, a commercially available homoisotactic polypropylene from Exxon Chemical Company, Houston, Tex. The second polymer component was SPC-1 as characterized in Tables 1, 2 and 3 above.

TABLE 4

| | Composition in grams of FPC and SPC-1 | | | | | | | | |
|---|---|---|---|---|---|---|---|---|---|
| FPC | 64 | 56 | 48 | 40 | 32 | 24 | 16 | 8 | 0 |
| SPC-1 | 8 | 16 | 24 | 32 | 40 | 48 | 56 | 64 | 72 |
| | Stress (psi) | | | | | | | | |
| E = 10% | 4836 | 4243 | 3839 | 3274 | 2878 | 2475 | 2054 | 1705 | 1400 |
| E = 25% | 2782 | 3526 | 3460 | 3238 | 2863 | 2523 | 2146 | 1835 | 1502 |
| E = 50% | 2566 | 2539 | 2472 | 2589 | 2218 | 2135 | 1758 | 1501 | 1136 |
| E = 100% | | 2509 | 2434 | 2231 | 2169 | 1907 | 1642 | 1376 | 1136 |
| E = 150% | | | | 2239 | 2130 | 1844 | 1665 | 1407 | 1173 |
| E = 200% | | | | 2247 | 2105 | 1854 | 1679 | 1440 | 1197 |
| E = 250% | | | | 2245 | 2093 | 1887 | 1691 | 1478 | 1218 |
| E = 300% | | | | 2253 | 2066 | 1896 | 1699 | 1474 | 1231 |
| E = 350% | | | | 2251 | 2073 | 1905 | 1698 | 1476 | 1239 |
| E = 400% | | | | 2251 | 2137 | 1879 | 1708 | 1478 | 1218 |
| E = 450% | | | | 2247 | 2158 | 1869 | 1718 | 1474 | 1223 |
| E = 500% | | | | 2246 | 2177 | 1901 | 1726 | 1470 | 1279 |
| E = 550% | | | | | 2229 | 2324 | 2350 | 2278 | 2261 |
| E = 600% | | | | | | 3072 | 3229 | 3159 | 2970 |
| E = 650% | | | | | | 3415 | 3538 | 3422 | 3010 |
| E = 700% | | | | | | 3691 | | | 3135 |
| E = 750% | | | | | | | | | 3294 |

Table 4: Stress versus extension (E) data for blends of first polymer component and second polymer component where the second polymer component is Component SPC-1 in the tables above. Shaded areas represent broken samples. Clear areas represent lack of data due to extension beyond machine limits.

Example 5

The first polymer component was Escorene 4292, a commercially available homoisotactic polypropylene from Exxon Chemical Company, Houston, Tex. The second polymer component was Component SPC-2 as characterized in Tables 1, 2 and 3 above. These components were mixed in the same manner as described for Example 4.

TABLE 5

| | Composition in grams of FPC and SPC-2 | | | | | | | | |
|---|---|---|---|---|---|---|---|---|---|
| FPC | 64 | 56 | 48 | 40 | 32 | 24 | 16 | 8 | 0 |
| SPC | 8 | 16 | 24 | 32 | 40 | 48 | 56 | 64 | 72 |
| | Stress (psi) | | | | | | | | |
| E = 10% | 4616 | 3477 | 2777 | 2221 | 1405 | 1012 | 705 | 488 | 326 |
| E = 25% | 2754 | 2863 | 2319 | 2178 | 1518 | 1143 | 822 | 634 | 472 |
| E = 50% | [broken] | 2459 | 2221 | 1911 | 1517 | 1183 | 852 | 660 | 539 |
| E = 100% | [broken] | [broken] | 2243 | 1872 | 1522 | 1236 | 897 | 675 | 552 |
| E = 150% | [broken] | [broken] | 2261 | 1910 | 1546 | 1290 | 948 | 703 | 558 |
| E = 200% | [broken] | [broken] | 2271 | 1947 | 1581 | 1345 | 1003 | 737 | 574 |
| E = 250% | [broken] | [broken] | 2317 | 2037 | 1696 | 1486 | 1128 | 834 | 631 |
| E = 300% | [broken] | [broken] | 2341 | 2061 | 1788 | 1579 | 1210 | 904 | 690 |
| E = 350% | [broken] | [broken] | [broken] | 2078 | 1919 | 1704 | 1313 | 995 | 778 |
| E = 400% | [broken] | [broken] | [broken] | 2167 | 2096 | 1864 | 1452 | 1106 | 894 |
| E = 450% | [broken] | [broken] | [broken] | 2221 | 2319 | 2069 | 1613 | 1239 | 1031 |
| E = 500% | [broken] | [broken] | [broken] | 2397 | 2597 | 2344 | 1810 | 1398 | 1186 |
| E = 550% | [broken] | [broken] | [broken] | [broken] | 2976 | 2691 | 2060 | 1600 | 1350 |
| E = 600% | [broken] | [broken] | [broken] | [broken] | 3611 | 3224 | 2443 | 1854 | 1547 |
| E = 650% | [broken] | [broken] | [broken] | [broken] | [broken] | | 3660 | 2946 | |
| E = 700% | [broken] | [broken] | [broken] | [broken] | [broken] | | | | |
| E = 750% | [broken] | [broken] | [broken] | [broken] | [broken] | | | | |

Table 5: Stress versus extension (E) data for blends of first polymer component and second polymer component where the second polymer component is component SPC-2 in the tables above. Shaded areas with no data represent broken samples. Clear areas represent lack of data due to extension beyond machine limits.

Example 6

The first polymer component was Escorene 4292, a commercially available homoisotactic polypropylene from Exxon Chemical Company. The second polymer component was Component SPC-3 as characterized in Tables 1, 2 and 3 above. These components were mixed in the same manner as described for Example 4.

TABLE 6

| | Composition in grams of FPC and SPC-3 | | | | | | | | |
|---|---|---|---|---|---|---|---|---|---|
| FPC | 64 | 56 | 48 | 40 | 32 | 24 | 16 | 8 | 0 |
| SPC-3 | 8 | 16 | 24 | 32 | 40 | 48 | 56 | 64 | 72 |
| | Stress (psi) | | | | | | | | |
| E = 10% | 3700 | 3333 | 2427 | 1574 | 770 | 421 | 161 | 89 | 70 |
| E = 25% | 2614 | 2989 | 2229 | 1607 | 840 | 498 | 224 | 135 | 99 |
| E = 50% | | 2428 | 1944 | 1632 | 895 | 542 | 263 | 167 | 121 |
| E = 100% | | 2399 | 1999 | 1644 | 945 | 575 | 281 | 180 | 131 |
| E = 150% | | 2405 | 2043 | 1648 | 989 | 608 | 294 | 185 | 136 |
| E = 200% | | | 1995 | 1653 | 1069 | 675 | 329 | 188 | 135 |
| E = 250% | | | | | 1140 | 741 | 372 | 195 | 128 |
| E = 300% | | | | | 1195 | 807 | 423 | 209 | 124 |
| E = 350% | | | | | 1244 | 866 | 474 | 229 | 125 |
| E = 400% | | | | | 1273 | 925 | 528 | 255 | 129 |
| E = 450% | | | | | | 979 | 580 | 285 | 136 |
| E = 500% | | | | | | 1026 | 627 | 319 | 145 |
| E = 550% | | | | | | 1081 | 676 | 354 | 154 |
| E = 600% | | | | | | 1124 | 726 | 390 | 166 |
| E = 650% | | | | | | | 781 | 424 | 181 |
| E = 700% | | | | | | | 842 | 454 | 197 |
| E = 750% | | | | | | | 911 | 488 | 217 |
| E = 800% | | | | | | | 980 | 529 | 236 |
| E = 850% | | | | | | | 1049 | 577 | 256 |
| E = 900% | | | | | | | 1220 | 689 | 299 |
| E = 950% | | | | | | | 1322 | 760 | 322 |

Table 6: Stress versus extension (E) data for blends of first polymer component and second polymer component where the second polymer component is Component SPC-3 in the tables above. Shaded areas with no data represent broken samples. Clear areas represent lack of data due to extension beyond machine limits.

Example 7

The first polymer component was Escorene 4292, a commercially available homoisotactic polypropylene from Exxon Chemical Company, Houston, Tex. The second polymer component was Component SPC-4 as characterized in Tables 1, 2 and 3 above. These components were mixed in the same manner as described for Example 4.

TABLE 7

| | Composition in grams of FPC and SPC-4 | | | | | | | | |
|---|---|---|---|---|---|---|---|---|---|
| FPC | 64 | 56 | 48 | 40 | 32 | 24 | 16 | 8 | 0 |
| SPC-4 | 8 | 16 | 24 | 32 | 40 | 48 | 56 | 64 | 72 |
| | Stress (psi) | | | | | | | | |
| E = 10% | 4485 | 3719 | 3091 | 2387 | 1879 | 1372 | 950 | 717 | 527 |
| E = 25% | 3983 | 3467 | 2944 | 2413 | 1960 | 1467 | 1082 | 893 | 686 |
| E = 50% | 2691 | 2473 | 2264 | 2186 | 1818 | 1429 | 1062 | 896 | 728 |
| E = 100% | | 2448 | 2390 | 1951 | 1713 | 1387 | 1046 | 851 | 670 |
| E = 150% | | 2496 | 2436 | 1965 | 1742 | 1390 | 1065 | 854 | 671 |
| E = 200% | | 2523 | 2449 | 2001 | 1775 | 1411 | 1097 | 869 | 691 |
| E = 250% | | 2532 | 2456 | 2038 | 1790 | 1448 | 1141 | 894 | 700 |

TABLE 7-continued

| E | | | | | | | | |
|---|---|---|---|---|---|---|---|---|
| E = 300% | 2537 | 2445 | 2070 | 1781 | 1496 | 1195 | 935 | 720 |
| E = 350% | 2548 | 2434 | 2087 | 1765 | 1568 | 1268 | 991 | 791 |
| E = 400% | 2564 | 2467 | 2152 | 1878 | 1682 | 1374 | 1089 | 877 |
| E = 450% | 2552 | — | 2242 | 1998 | 1854 | 1522 | 1235 | 1032 |
| E = 500% | — | — | 2407 | 2255 | 2101 | 1726 | 1416 | 1230 |
| E = 550% | — | — | 2642 | 2603 | 2398 | 1990 | 1637 | 1444 |
| E = 600% | — | — | 3048 | 3020 | 2689 | 2275 | 1882 | 1661 |
| E = 650% | — | — | — | — | 3410 | 2983 | 2540 | 2116 | 1824 |
| E = 700% | — | — | — | — | — | 3310 | 2730 | 2243 | 1821 |
| E = 750% | — | — | — | — | — | 3741 | 3183 | 2569 | 2387 |

Table 7: Stress versus extension (E) data for blends of first polymer component and second polymer component where the second polymer component is Component SPC-4 in the tables above. Shaded areas with no data represent broken samples. Clear areas represent lack of data due to extension beyond machine limits.

Example 8

The first polymer component was Escorene 4292, a commercially available homoisotactic polypropylene from Exxon Chemical Company, Houston, Tex. The second polymer component was a mixture of Component SPC-1 and Component SPC-5 as characterized in Tables 1, 2 and 3 above. These components were mixed in the same manner as described for Example 4.

TABLE 8

| | Composition in grams of FPC, SPC-1 and SPC-5 | | | | | | | | |
|---|---|---|---|---|---|---|---|---|---|
| FPC | 32 | 28 | 24 | 20 | 16 | 12 | 8 | 4 | 0 |
| SPC-1 | 32 | 28 | 24 | 20 | 16 | 12 | 8 | 4 | 0 |
| SPC-5 | 8 | 16 | 24 | 32 | 40 | 48 | 56 | 64 | 72 |
| | Stress (psi) | | | | | | | | |
| E = 10% | 2158 | 1705 | 1382 | 875 | 523 | 342 | 215 | 149 | 97 |
| E = 25% | 2208 | 1903 | 1533 | 1035 | 656 | 437 | 296 | 216 | 141 |
| E = 50% | 1977 | 1823 | 1510 | 1102 | 725 | 489 | 342 | 257 | 174 |
| E = 100% | 1761 | 1655 | 1440 | 1154 | 798 | 546 | 379 | 286 | 200 |
| E = 150% | 1775 | 1585 | 1412 | 1194 | 868 | 605 | 417 | 304 | 211 |
| E = 200% | 1787 | 1582 | 1418 | 1236 | 942 | 669 | 465 | 329 | 219 |
| E = 250% | 1793 | 1601 | 1441 | 1280 | 1020 | 734 | 521 | 364 | 229 |
| E = 300% | 1802 | 1631 | 1475 | 1337 | 1103 | 801 | 585 | 410 | 245 |
| E = 350% | 1819 | 1662 | 1524 | 1409 | 1190 | 873 | 653 | 468 | 267 |
| E = 400% | 1841 | 1698 | 1592 | 1501 | 1290 | 955 | 729 | 530 | 297 |
| E = 450% | 1862 | 1740 | 1678 | 1626 | 1408 | 1058 | 813 | 606 | 337 |
| E = 500% | 1888 | 1757 | 1874 | 1791 | 1543 | 1187 | 920 | 697 | 387 |
| E = 550% | 1904 | 1930 | 2235 | 2027 | 1730 | 1352 | 1077 | 813 | 448 |
| E = 600% | 1935 | 2900 | 2627 | 2316 | 1988 | 1612 | 1335 | 998 | 521 |
| E = 650% | 1977 | 3452 | 2939 | 2659 | 2460 | 1978 | 1652 | 1233 | 616 |
| E = 700% | 2016 | — | 3159 | 3056 | | 2530 | 2005 | 1492 | 759 |
| E = 750% | — | — | 3377 | 3857 | — | — | 2446 | 1836 | 914 |
| E = 800% | — | — | | | — | — | | | 1075 |
| E = 900% | — | — | — | — | — | — | — | — | 1277 |
| E = 950% | — | — | — | — | — | — | — | | |

Table 8: Stress versus extension (E)-data for blends of first polymer component and EPR in the tables above. Shaded areas with no data represent broken samples.

Example 9 (Comparative)

The first polymer component was Escorene 4292, a commercially available homoisotactic polypropylene from Exxon Chemical Company, Houston, Tex. The second polymer component was Component EPR as characterized in Tables 1, 2 and 3 above. These components were mixed in the same manner as described for Example 4.

TABLE 9

| | Composition in grams of FPC and EPR | | | | | | | | |
|---|---|---|---|---|---|---|---|---|---|
| FPC | 64 | 56 | 48 | 40 | 32 | 24 | 16 | 8 | 0 |
| EPR | 8 | 16 | 24 | 32 | 40 | 48 | 56 | 64 | 72 |
| | Stress (psi) | | | | | | | | |
| E = 10% | 3456 | 3125 | 2589 | 960 | 789 | 654 | 728 | 112 | 12 |
| E = 25% | | 3358 | 3596 | 1122 | 999 | 890 | 754 | 244 | 18 |
| E = 50% | | | | 1536 | 1356 | 1100 | 723 | 312 | 19 |
| E = 100% | | | | 2125 | 1681 | 1292 | 812 | 432 | |
| E = 150% | | | | | 1674 | 1330 | 860 | | |
| E = 200% | | | | | 1744 | 1391 | 898 | | |
| E = 250% | | | | | | | | | |

Table 9: Stress versus extension (E) data for blends of first polymer component and EPR in the tables above. Shaded areas with no data represent broken samples.

Example 10 (Comparative)

The first polymer component was Escorene 4292, a commercially available homoisotactic polypropylene from Exxon Chemical Company, Houston, Tex. The second polymer component was aePP as characterized in Tables 1, 2 and 3 above. These components were mixed in the same manner as described for Example 4.

TABLE 10

| | Composition in grams of FPC and aePP | | | | | | | | |
|---|---|---|---|---|---|---|---|---|---|
| FPC | 64 | 56 | 48 | 40 | 32 | 24 | 16 | 8 | 0 |
| aePP | 8 | 16 | 24 | 32 | 40 | 48 | 56 | 64 | 72 |
| | Stress (psi) | | | | | | | | |
| E = 10% | 3258 | 3012 | 2258 | 872 | 635 | 558 | 432 | 189 | 15 |
| E = 25% | | | 2785 | 1687 | 975 | 870 | 856 | 215 | 15 |
| E = 50% | | | | | 1012 | 912 | 816 | 256 | 27 |
| E = 100% | | | | | 974 | 865 | 826 | 354 | |
| E = 150% | | | | | | 713 | 765 | | |
| E = 200% | | | | | | | | | |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

We claim:

1. A propylene polymer comprising from about 84 to about 95 wt % propylene, the remainder comprising ethylene and/or a C4+ α-olefin, the polymer having a heat of fusion <75 J/g, a MWD of from about 2 to about 3.2, a crystallinity of from about 2 to about 65%, the polymer having a Mooney Viscosity (ML 1+4@125° C.) ≧about 14.

2. The polymer according to claim 1 having a heat of fusion ≦60 J/g.

3. The polymer according to claim 2 having a heat of fusion ≦50 J/g.

4. The polymer according to claim 1 having a heat of fusion of from about 25 to about 60 J/g.

5. The polymer according to claim 1 having a crystallinity of from about 2 to about 30%.

6. The polymer according to claim 1 having a crystallinity of from about 10 to about 30%.

7. The polymer according to claim 1 comprising from about 84 to about 92 wt % propylene.

8. The polymer according to claim 7 comprising from about 85 to about 91 wt % propylene.

9. The polymer according to claim 1 comprising ethylene.

10. The polymer according to claim 7 comprising ethylene.

11. The polymer according to claim 4 having a crystallinity from about 2 to about 30% and comprising from about 84 to about 94 wt % propylene.

12. The polymer according to claim 1 wherein the polymer is produced in a solution process in the presence of a hafnium containing catalyst composition.

13. The polymer according to claim 12 wherein the polymer is produced in the presence of a catalyst activator comprising boron, fluorine and/or aluminum.

14. The polymer according to claim 1 comprising ethylene and butene.

15. The polymer according to claim 11 having a Mooney Viscosity ≧about 23.9.

16. The polymer according to claim 11 having a Mooney Viscosity ≧about 38.4.

17. A propylene polymer comprising from about 84 to about 95 wt % propylene, the polymer having a heat of fusion less than about 60 J/g, a crystallinity of from about 2 to about 65%, the polymer having a Mooney Viscosity (ML 1+4 @125° C.) ≧about 14.

18. The polymer according to claim 17 having a heat of fusion ≦40 J/g.

19. The polymer according to claim 17 having a heat of fusion of from about 25 to about 60 J/g.

20. The polymer according to claim 17 having a crystallinity of from about 2 to about 30%.

21. The polymer according to claim 17 having a crystallinity of from about 10 to about 30%.

22. The polymer according to claim 17 comprising from about 84 to about 92 wt % propylene.

23. The polymer according to claim 22 comprising from about 85 to about 91 wt % propylene.

24. The polymer according to claim 17 comprising ethylene.

25. The polymer according to claim 19 having a crystallinity from about 2 to about 30% and comprising from about 84 to about 94 wt % propylene.

26. The polymer according to claim 17 wherein the polymer is produced in a solution process in the presence of a hafnium containing catalyst composition and a catalyst activator comprising boron, fluorine and/or aluminum.

27. The polymer according to claim 17 comprising ethylene and butene.

28. The polymer according to claim 17 having a Mooney Viscosity ≧about 23.9.

29. The polymer according to claim 28 having a Mooney Viscosity ≧about 38.4.

30. A propylene ethylene polymer comprising from about 84 to about 95 wt % propylene, the polymer having a heat of fusion <75 J/g, a crystallinity of from about 2 to about 20%, the polymer having a Mooney Viscosity (ML 1+4 @125° C.) about 14.

31. The polymer according to claim 30 having a heat of fusion ≦40 J/g.

32. The polymer according to claim 30 having a heat of fusion of from about 25 to about 60 J/g.

33. The polymer according to claim 30 having a crystallinity of from about 10 to about 20%.

34. The polymer according to claim 30 comprising from about 84 to about 92 wt % propylene.

35. The polymer according to claim 34 comprising from about 85 to about 91 wt % propylene.

36. The polymer according to claim 33 comprising from about 84 to about 94 wt % propylene.

37. The polymer according to claim 36 wherein the polymer is produced in a solution process in the presence of a hafnium containing catalyst composition and a catalyst activator comprising boron, fluorine andlor aluminum.

38. The polymer according to claim 30 having a MWD of from about 2.0 to about 3.2.

39. The polymer according to claim 30 having a Mooney Viscosity ≧about 23.9.

40. The polymer according to claim 39 having a Mooney Viscosity ≧about 38.4.

41. A propylene polymer comprising from about 84 to about 95 wt % propylene, the remainder comprising ethylene andlor a C4+ alpha olefin, the polymer having a heat of fusion <60 J/g, a crystallinity of from about 2 to about 20%, a MWD of from about 2.0 to about 3.2, the polymer made in a solution process in the presence of a hafnium containing catalyst composition and in the presence of a catalyst activator comprising boron, fluorine and/or aluminum.

42. The polymer according to claim 41 wherein the polymer comprises ethylene.

43. The polymer according to claim 41 wherein the polymer has a melting point ≦about 105° C.

44. The polymer according to claim 41 wherein the polymer has a melting point ≦about 90° C.

45. The polymer according to claim 41 wherein the polymer has a melting point ≦about 75° C.

46. The polymer according to claim 41 wherein the polymer has a melting point ≦60° C.

47. A propylene polymer comprising from about 84 to about 95 wt % propylene, from about 0.01 to about 10 wt % of a diene, the remainder comprising ethylene and/or butene, the polymer having a heat of fusion <60 J/g, a crystallinity of from about 2 to about 20%, a MWD of from about 2.0 to about 3.2, the polymer having a Mooney Viscosity (ML 1+4 @ 125° C.) ≧about 14, wherein the polymer is made in a solution process with a catalyst system comprising hafnium and wherein the catalyst system further comprises an activator comprising boron, fluorine and/or aluminum.

48. The polymer according to claim 1 having a melting point ≦105° C.

49. The polymer according to claim 17 having a melting point ≦105° C.

50. The polymer according to claim 30 having a melting point ≦105° C.

51. The polymer according to claim 47 having a melting point ≦105° C.

52. The polymer according to claim 1 having a melting point ≦75° C.

53. The polymer according to claim 17 having a melting point ≦75° C.

54. The polymer according to claim 30 having a melting point ≦75° C.

55. The polymer according to claim 47 having a melting point ≦75° C.

56. The polymer according to claim 1 having a melting point from about 25° C. to about 60° C.

57. The polymer according to claim 17 having a melting point from about 25° C. to about 60° C.

58. The polymer according to claim 30 having a melting point from about 25° C. to about 60° C.

59. The polymer according to claim 47 having a melting point from about 25° C. to about 60° C.

60. A polymer blend comprising a polymer according to claim 1.

61. A polymer blend comprising a polymer according to claim 17.

62. A polymer blend comprising a polymer according to claim 30.

63. A polymer blend comprising a polymer according to claim 41.

64. A polymer blend comprising a polymer according to claim 47.

* * * * *